United States Patent [19]

Crist

[11] 4,215,571
[45] Aug. 5, 1980

[54] EXPENDABLE BATHYTHERMOGRAPH FOR USE UNDER ICE

[75] Inventor: Ralph P. Crist, Harrisburg, Pa.

[73] Assignee: The United States of America as represented by the Secretary of the Navy, Washington, D.C.

[21] Appl. No.: 105,879

[22] Filed: Jan. 12, 1971

[51] Int. Cl.³ ............................................. G01W 1/00
[52] U.S. Cl. ................................... 73/170 A; 73/300; 73/344; 73/362 R
[58] Field of Search .................. 73/170 R, 170 A, 344, 73/300, 362; 9/8

[56] References Cited

U.S. PATENT DOCUMENTS

| | | | |
|---|---|---|---|
| 3,221,556 | 12/1965 | Campbell et al. | 73/107 A |
| 3,336,800 | 8/1967 | Appleby et al. | 73/107 A |
| 3,339,407 | 9/1967 | Campbell et al. | 73/107 A |
| 3,349,613 | 10/1967 | Francis | 73/107 A |
| 3,520,188 | 7/1970 | Bixby | 73/107 A |
| 3,552,205 | 1/1971 | Francis | 73/107 A |
| 3,605,492 | 9/1971 | Stohrer | 73/107 A |

Primary Examiner—Stephen J. Lechert, Jr.
Attorney, Agent, or Firm—R. S. Sciascia; Q. E. Hodges

[57] ABSTRACT

A temperature probe for use by submersibles when under ice, whereby impingement of the Bathythermograph against the under surface of the ice causes the probe to be released and fall to the bottom. The probe may also be released by the bathythermograph reaching the surface.

4 Claims, 2 Drawing Figures

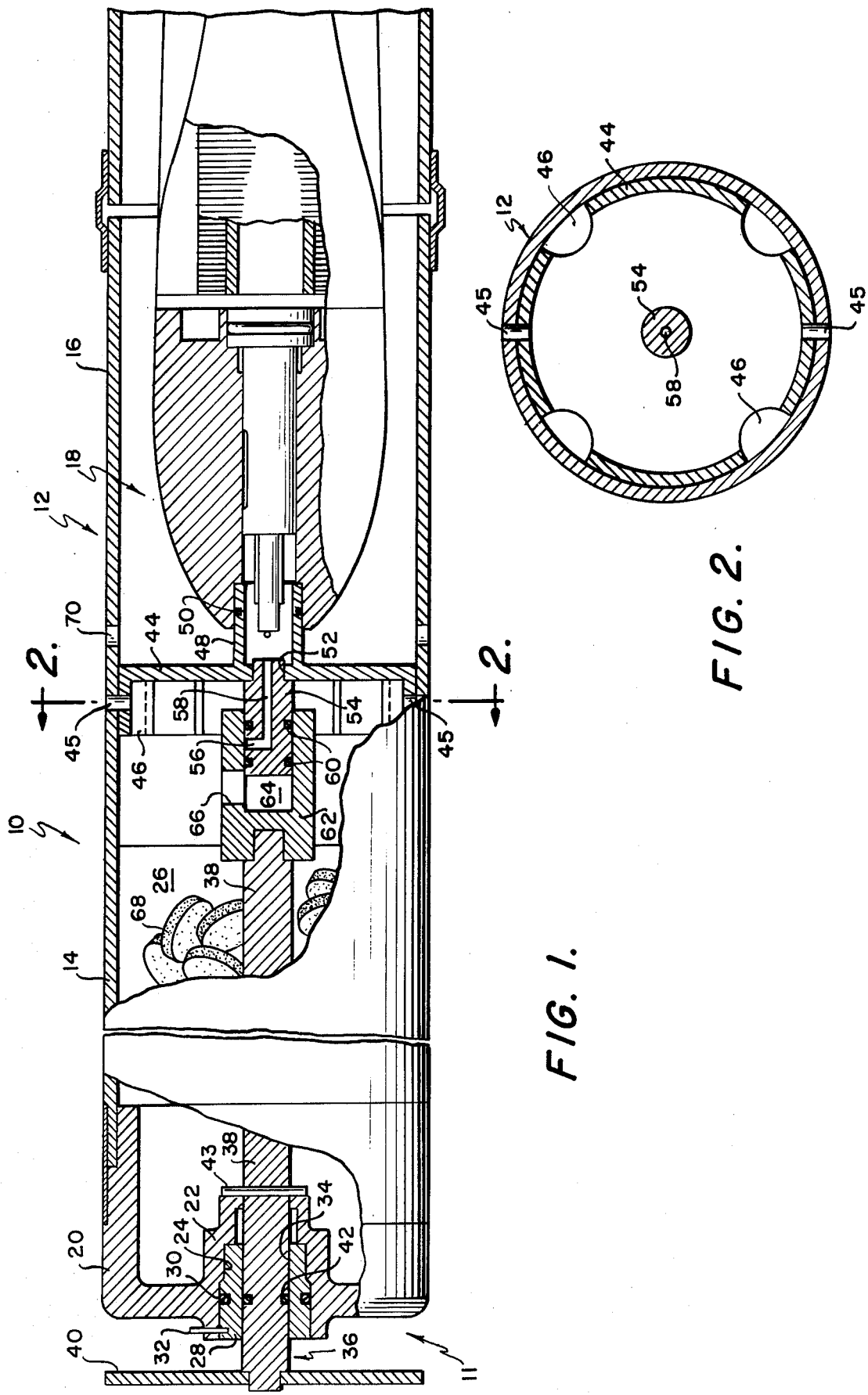

EXPENDABLE BATHYTHERMOGRAPH FOR USE UNDER ICE

The invention described herein may be manufactured and used by or for the Government of the United States of America for Governmental purposes without the payment of any royalties thereon or therefor.

BACKGROUND OF THE INVENTION

1. Field of the Invention

This invention relates to apparatus for measuring the properties of seawater when the apparatus is released from a vehicle submerged in the sea. The apparatus used to measure the water properties is the well known bathythermograph. These devices when released, are positively buoyant and rise toward the surface. At a predetermined depth the temperature probe is released and falls to the bottom. The probe is connected to the launching vehicle by a thin wire over which the temperature data is sent to the vehicle. When the probe has reached the end of the wire or when the maximum depth desired has been reached, the probe and wire are released to sink to the bottom. As the rate of descent of the probe is known a temperature-depth graph is generated.

Such data is critical for submersibles as they rely on sonar for detection of other vehicles or submerged objects. Sonar requires accurate information on the properties of the ambient water in which the vehicle is operating, and in particular, the temperature-depth relationship.

2. Description of the Prior Art

Current temperature probes when released rise toward the surface and are released to fall back down when a predetermined depth at or near the surface is reached. This is satisfactory when the submerged vehicle is operating in the open sea. However, when the submerged vehicle is operating under an ice flow or an ice cap, current apparatus is unsatisfactory. Often the apparatus is trapped at too great a depth under an ice cap and is not released. This can only be overcome with current apparatus by determining the depth of the ice, which is in itself an inaccurate process, and setting the probe to release at a greater depth of water than the thickness of the ice.

The prior art is best illustrated by the inventor's prior U.S. Pat. No. 3,524,347 and U.S. Pat. application Ser. No. 22,939, filed on Mar. 26, 1970.

SUMMARY OF THE INVENTION

The purpose of this invention is to provide for release of a temperature sensing probe from its buoyant carrier regardless of the surface of the sea under which the submerged launching vehicle is operating. The probe is held to its buoyant carrier by the usual low pressure chamber. The nose of the carrier has a plunge assembly that impinges on the under side of the ice to destroy the integrity of the low pressure chamber and release the probe. When not operating under ice, the invention will still function properly as the reduced surface pressure will equalize that in the low pressure chamber and the weight of the probe will pull it loose from the buoyant carrier.

DESCRIPTION OF THE DRAWING

FIG. 1 is a longitudinal view of the portion of a bathythermograph embodying the invention, with parts in section for clarity.

FIG. 2 is a section view taken along the line 2—2 of FIG. 1.

DESCRIPTION OF THE INVENTION

Referring now to the drawing, a standard bathythermograph unit 10 is shown which is launched from a submerged vehicle, as described in inventor's prior U.S. Pat. No. 3,524,347, with a release mechanism 11 mounted thereon which constitutes the instant invention.

The unit 10 is similar to that in the aforementioned patent and has a cannister 12 with a forward buoyant section 14 and a rear section 16 containing the temperature probe 18.

The forward section 14 of the cannister 12 has the release mechanism 11 mounted in a nose section 20. An enlarged boss 22 is formed on the nose section 20 and has a bore 24 opening therethrough into an interior compartment 26. A bushing 28 is fitted into the bore 24 with an O-ring 30 providing a fluid tight seal therebetween. A pin 32 extends through the boss 22, at the forward end thereof, and into the bushing 28 to retain it in position and prevent relative movement between the boss and the bushing. The bushing 28 has a central bore 34 which guides a plunger assembly 36.

The plunger assembly 36 has an elongated shaft 38 which extends through and is guided by the bore 34. A disc 40 is attached to the forward end of the shaft 38 to form an impact point as the bathythermograph ascends through the water. An O-ring 42 on the shaft 38 provides a water and pressure tight seal between the shaft 38 and the bushing 28 to maintain the integrity of the compartment 26 in the forward section 14 of the cannister. A pin 43 extends through the shaft 38 behind the boss 22 to limit the forward motion of the shaft 38 and to provide a stop when the plunger assembly is pulled forward to set the release mechanism 11.

A standard wall member 44, as in the inventor's previous patent, has a diameter the same as the interior diameter of the cannister 12, and is inserted therein to define the interior compartment 26 and to separate the buoyant section 14 from the probe containing rear section 16. A pair of pins 45 extend through the cannister 12 and into the wall member 44 to maintain it in position. The wall member 44 has openings 46 on the circumference to provide communication between the compartment 26 and the rear section 16. The wall member 44 also has a rear facing spindle 48 with an O-ring 50 thereon to provide the pressure tight mounting for the probe 18. The member 44 has an opening 52, concentric with the spindle 48, in which is mounted a cylindrical pressure release plug 54. The plug 54 has a conduit extending radially inward at 56, from the circumference at the forward end, into the interior of the spindle and rearwardly at 58 to vent the spindle, as will be set forth hereinafter. The plug 54 has a pair of O-rings 60 mounted on either side of the inlet 56 to sealingly engage a sealing plug 62.

The plug 62 is affixed at one end to the free end of the shaft 38 and has a bore 64 which is slidingly received on the plug 54 to be sealed thereon by the O-rings 60. An opening 66 extends radially inward of the plug 62 to the bore 64. The length of the shaft 38 is such that when the plunger assembly 36 is pulled forward into a "launch" position, with the pin 43 against the boss 22, the opening 66 is forward of the pressure release plug 54 and the sealing plug 62 engages the O-rings 60 to seal the conduits 56–58. When the disc 40 strikes ice, the plunger assembly 36 is driven rearwardly, breaking the seal of the O-rings 60 between the blocks 54 and 62, and venting the spindle 48 through the conduits 56–58 and opening 66 to ambient conditions.

The operation of the release mechanism 11 is relatively simple and straight forward. The assembly of the bathythermograph 10 is done at atmospheric pressure thus maintaining the entire unit at such pressure. Gas producing pellets 68, such as lithiumhydride, are put in compartment 26 and the plunger assembly is pulled forward to seal off the conduits 56–58 and the spindle 48 with the probe 18 mounted thereon. The launch procedure is the same as on a standard bathythermograph unit wherein it is exposed to seawater so that water flows through apertures 70 in the cannister 12, past the openings 46 in the wall 44 and into the compartment 26. As the mixing of the pellets 68 and water liberates gas the water is displaced rearwardly past the openings 46 making the buoyant section 14 buoyant to float the unit 10 toward the surface. The buoyant chamber 14 in front and the weighted probe 18 at the rear insure the plunger assembly 36 will be the foremost part as the unit 10 ascends. When the plunger assembly 36 strikes the underside of ice the assembly is driven rearwardly breaking the seal of block 62 on block 54 thereby equalizing the pressure within compartment 26 with that in spindle 48 through the conduits 56–58 and opening 66. With this equalization of pressure, the weighted probe will pull free from the spindle 48 and descend. If it is desired to use the unit 10, as disclosed herein, in open sea no adaptation or modification is necessary. When the unit 10 reaches the surface the ambient pressure is the same as that in the spindle 48, since it was assembled at atmospheric pressure, and the weighted probe 18 will pull free and descend.

As can be seen from the above disclosure, a simple but unique and reliable release system for a bathythermograph has been created which can be used under ice or in the open sea. The release system is adapted to back fitting on existing units as well as for new manufacture.

Obviously many modifications and variations of the present invention are possible in the light of the above teachings. It is therefore to be understood that within the scope of the appended claims the invention may be practiced otherwise than as specifically described.

What is claimed is:

1. A release mechanism for the sensor probe of a cannister type bathythermograph, comprising:
    a wall member within the cannister for defining a forward section and a rearward section;
    a probe assembly mounted within the rearward section;
    a plunger assembly movably mounted within the forward section and extending externally from the cannister; and
    means interconnecting the plunger and probe assemblies for providing pressure equalization between the forward section and the probe assembly upon sufficient impacting to move the plunger assembly toward the rearward section.

2. The release mechanism of claim 1 wherein the means for providing pressure equalization includes:
    a release plug mounted within the forward section and having conduits extending from the forward section to the probe assembly; and
    a sealing plug slidably connecting the plunger assembly and the release plug for sealing and for venting the conduits.

3. A release mechanism for the sensor probe of a cannister type bathythermograph comprising:
    a wall member within the cannister for defining a forward section and a rearward section;
    a probe assembly mounted within the rearward section;
    means to permit ambient seawater to enter the rearward section;
    means to permit the ambient seawater to flow from the rearward section to the forward section;
    means within the forward section for mixing with the ambient seawater for liberating a gas which displaces the seawater in the forward section;
    a plunger assembly movably mounted within the forward section and extending externally therefrom; and
    means interconnecting the plunger and probe assemblies for providing pressure equalization between the gas filled forward section and the probe assembly upon sufficient impacting to move the plunger assembly toward the rearward section.

4. The release mechanism of claim 3 wherein the means for providing pressure equalization includes:
    a release plug mounted within the forward section and having conduits extending from the forward section to the probe assembly; and
    a sealing plug slidably connecting the plunger assembly and the release plug for sealing and venting the conduits.

* * * * *